(12) United States Patent
Ohno et al.

(10) Patent No.: US 11,921,341 B2
(45) Date of Patent: Mar. 5, 2024

(54) OPTICAL CABLE AND OPTICAL CABLE MANUFACTURING METHOD

(71) Applicants: FUJIKURA LTD., Tokyo (JP); NIPPON TELEGRAPH AND TELEPHONE CORPORATION, Tokyo (JP)

(72) Inventors: Masatoshi Ohno, Sakura (JP); Akira Namazue, Sakura (JP); Ken Osato, Sakura (JP); Yusuke Yamada, Musashino (JP); Yuta Maruo, Musashino (JP); Akira Sakurai, Musashino (JP); Shigekatsu Tetsutani, Musashino (JP); Hiroaki Tanioka, Musashino (JP)

(73) Assignees: Fujikura Ltd., Tokyo (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 18/155,309

(22) Filed: Jan. 17, 2023

(65) Prior Publication Data
US 2023/0152548 A1    May 18, 2023

Related U.S. Application Data

(63) Continuation of application No. PCT/JP2021/030854, filed on Aug. 23, 2021.

(30) Foreign Application Priority Data

Sep. 2, 2020    (JP) .................................. 2020-147296

(51) Int. Cl.
G02B 6/44    (2006.01)

(52) U.S. Cl.
CPC ........... *G02B 6/448* (2013.01); *G02B 6/4404* (2013.01); *G02B 6/4413* (2013.01); *G02B 6/4432* (2013.01); *G02B 6/4434* (2013.01)

(58) Field of Classification Search
CPC .... G02B 6/448; G02B 6/4404; G02B 6/4413; G02B 6/4432; G02B 6/4434
(Continued)

(56) References Cited

U.S. PATENT DOCUMENTS

| 2015/0370026 A1 | 12/2015 | Hudson, II et al. |
| 2020/0073068 A1 | 3/2020 | Shimizu et al. |

(Continued)

FOREIGN PATENT DOCUMENTS

| JP | 2014077869 A | 5/2014 |
| JP | 2014139609 A | 7/2014 |

(Continued)

OTHER PUBLICATIONS

International Search Report issued in corresponding International Application No. PCT/JP2021/030854, dated Nov. 2, 2021 (4 pages).
(Continued)

*Primary Examiner* — Jerry M Blevins
(74) *Attorney, Agent, or Firm* — Osha Bergman Watanabe & Burton LLP

(57) ABSTRACT

An optical cable includes: twisted optical fiber units each including a fiber group formed by optical fibers. At least one of the optical fiber units includes a filling that wraps an outer circumference of the fiber group.

13 Claims, 12 Drawing Sheets

(58) Field of Classification Search
USPC .......................................................... 385/114
See application file for complete search history.

(56) References Cited

U.S. PATENT DOCUMENTS

| | | |
|---|---|---|
| 2020/0249406 A1 | 8/2020 | Bookbinder et al. |
| 2021/0271042 A1* | 9/2021 | Sato ....................... G02B 6/441 |
| 2023/0161125 A1 | 5/2023 | Sato et al. |

FOREIGN PATENT DOCUMENTS

| | | |
|---|---|---|
| JP | 2017009924 A | 1/2017 |
| JP | 2019056837 A | 4/2019 |
| JP | 2019128363 A | 8/2019 |
| JP | 2020042175 A | 3/2020 |
| JP | 2020064098 A | 4/2020 |
| JP | 2020076915 A | 5/2020 |
| TW | I529439 B | 4/2016 |
| WO | 2018221142 A1 | 12/2018 |
| WO | 2020054493 A1 | 3/2020 |

OTHER PUBLICATIONS

Written Opinion issued in corresponding International Application No. PCT/JP2021/030854, dated Nov. 2, 2021 (4 pages).
Office Action issued in corresponding Taiwanese Patent Application No. 110132301, dated Sep. 7, 2022, with translation (9 pages).

* cited by examiner

| P1/P2 | DISMANTLEMENT EASINESS |
|---|---|
| 0.05 | PASSABLE |
| 0.1 | GOOD |
| 0.3 | GOOD |
| 0.5 | EXCELLENT |
| 0.7 | EXCELLENT |
| 1.0 | EXCELLENT |

FIG. 4

FILLING 1

| LOAD (N) | 0.5 | 1.0 | 1.5 | 2.0 | 2.5 |
|---|---|---|---|---|---|
| CIRCUMFERENTIAL LENGTH L2 (mm) | 4.63 | 3.72 | 3.31 | 3.06 | 2.93 |
| COMPRESSION RATE | 0.21 | 0.50 | 0.69 | 0.83 | 0.91 |

INITIAL CIRCUMFERENTIAL LENGTH L1 (mm) 5.59
RATE OF CHANGE OF COMPRESSION RATE ($N^{-1}$) 0.26

FILLING 2 (WATER-ABSORBENT YARN 1)

| LOAD (N) | 0.5 | 1.0 | 1.5 | 2.0 |
|---|---|---|---|---|
| CIRCUMFERENTIAL LENGTH L2 (mm) | 2.79 | 2.28 | 2.11 | 1.99 |
| COMPRESSION RATE | 0.13 | 0.38 | 0.49 | 0.57 |

INITIAL CIRCUMFERENTIAL LENGTH L1 (mm) 3.14
RATE OF CHANGE OF COMPRESSION RATE ($N^{-1}$) 0.17

FILLING 3 (WATER-ABSORBENT YARN 2)

| LOAD (N) | 0.5 | 1.0 | 1.5 | 2.0 | 2.4 |
|---|---|---|---|---|---|
| CIRCUMFERENTIAL LENGTH L2 (mm) | 5.70 | 5.12 | 4.85 | 4.52 | 4.27 |
| COMPRESSION RATE | 0.25 | 0.39 | 0.46 | 0.57 | 0.66 |

INITIAL CIRCUMFERENTIAL LENGTH L1 (mm) 7.1
RATE OF CHANGE OF COMPRESSION RATE ($N^{-1}$) 0.22

BUNDLING MEMBER

| LOAD (N) | 0.1 | 0.3 | 0.5 | 1.0 | 1.5 | 2.5 |
|---|---|---|---|---|---|---|
| CIRCUMFERENTIAL LENGTH L2 (mm) | 2.95 | 2.89 | 2.68 | 2.38 | 2.34 | 2.33 |
| COMPRESSION RATE | 0.11 | 0.13 | 0.22 | 0.37 | 0.40 | 0.40 |

INITIAL CIRCUMFERENTIAL LENGTH L1 (mm) 3.26

KEVLAR

| LOAD (N) | 0.0 | 0.1 | 0.5 | 1.0 | 1.5 | 1.9 | 2.4 |
|---|---|---|---|---|---|---|---|
| CIRCUMFERENTIAL LENGTH L2 (mm) | 2.84 | 2.48 | 2.27 | 2.30 | 2.25 | 2.25 | 2.24 |
| COMPRESSION RATE | 0.05 | 0.20 | 0.31 | 0.30 | 0.32 | 0.32 | 0.33 |

INITIAL CIRCUMFERENTIAL LENGTH L1 (mm) 2.98

FIG. 10

OPTICAL CABLE AND OPTICAL CABLE MANUFACTURING METHOD

CROSS-REFERENCE TO RELATED APPLICATIONS

This is a continuation application of International Patent Application No. PCT/JP2021/030854 filed Aug. 23, 2021, which claims the benefit of priority to Japanese Patent Application No. 2020-147296 filed Sep. 2, 2020. The full contents of the International Patent Application are incorporated herein by reference.

TECHNICAL FIELD

The present disclosure relates to an optical cable and an optical cable manufacturing method.

BACKGROUND

There is a known technique for forming an optical cable by housing, inside a sheath, a plurality of optical fiber units each being an optical fiber assembly formed by a plurality of optical fibers brought together. Japanese Patent Application Publication No. 2020-76915 describes placing a filling inside a press-wrapping tape wrapping up a plurality of optical fiber units in order to reduce occurrence of "untwisting" in which, when the plurality of optical fiber units are twisted in an S-Z configuration together, optical fibers move in untwisting directions.

If the space inside the optical cable deforms when the cable is bent, the postures of the members in the space inside the optical cable cannot be easily maintained.

SUMMARY

One or more embodiments of the present disclosure easily maintain the postures of the members in the space inside the optical cable even if the space inside the optical cable deforms when the cable is bent.

According to one or more embodiments of the present disclosure, an optical cable comprises: a plurality of optical fiber units each having a fiber group formed by a plurality of optical fibers, wherein the plurality of optical fiber units are twisted, at least one optical fiber unit of the plurality of optical fiber units has a filling, and the filling is wrapped around an outer circumference of the fiber group.

Other features of the present disclosure will become apparent in the following description and the drawings.

One or more embodiments of the present disclosure reduce untwisting of the optical fiber units with less fillings.

BRIEF DESCRIPTION OF THE DRAWINGS

FIG. 4 is a table showing evaluation results of easiness of dismantling the optical cable 1.

FIG. 10 is measurement results of the compression rates of fillings, a bundling member, and Kevlar.

DETAILED DESCRIPTION

Figure 1A:
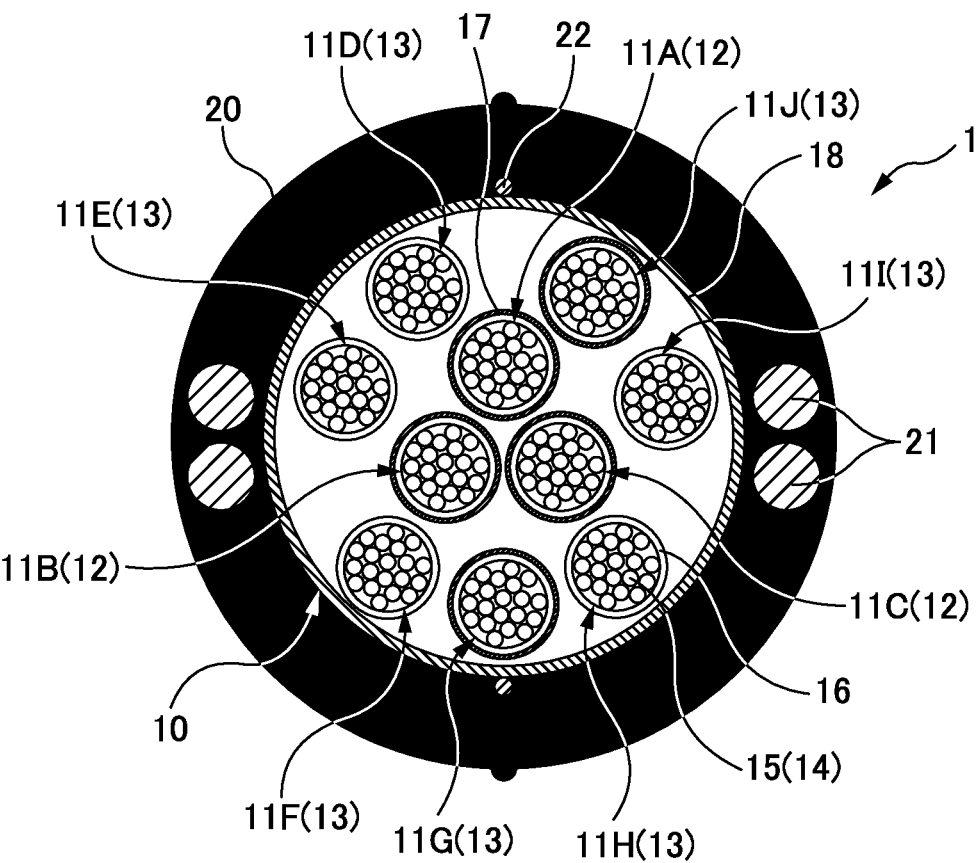
FIGS. 1A and 1B are diagrams illustrating an optical cable 1.

At least the following matters will be become apparent from the following description and the drawings.

An optical cable will become apparent, comprising: a plurality of optical fiber units each having a fiber group formed by a plurality of optical fibers, wherein the plurality of optical fiber units are twisted in an S-Z configuration, at least one optical fiber unit of the plurality of optical fiber units has a filling, and the filling is wrapped around an outer circumference of the fiber group. According to such an optical cable, untwisting of the optical fiber units can be reduced with less fillings.

Incidentally, in order to reduce "untwisting," voids may be decreased inside an optical cable by placing many fillings around the optical fiber units. However, more fillings inside an optical cable means stronger lateral pressure acting on the optical fibers, which may lead to more microbending losses. Thus, conflicting goals of decreasing fillings and reducing untwisting of optical fiber units may be met. In respect to the above, according to the above optical cable, untwisting of the optical fiber units can be reduced with less fillings.

The optical fiber units may each include a bundling member bundling the plurality of optical fibers together. This makes it possible for the optical fibers to be bundled together and not to come apart.

The filling may be wrapped around an outer side of the bundling member. This helps the filling come into contact with the neighboring optical fiber units, and thus, untwisting of the optical fiber units can be further reduced with less fillings.

It may further comprise the optical fiber units having the filling and the optical fiber units not having the filling. This helps decrease the fillings.

An inner-layer unit may be formed by the optical fiber unit, an outer-layer unit may be formed by circumferentially placing a plurality of the optical fiber units outside the inner-layer unit, and the optical fiber unit forming the inner-layer unit may have the filling. In this situation, the outer-layer unit may include the optical fiber units having the filling and the optical fiber units not having the filling. This makes it possible for untwisting of the optical fiber units to be further reduced with less fillings.

The optical fiber unit not having the filling may be placed between two of the optical fiber units having the filling in the outer-layer unit. This makes it possible for untwisting of the optical fiber units to be further reduced with less fillings.

P1/P2 may be 0.1 or greater, where P1 is a pitch of wrapping of the filling and P2 is a pitch of twisting the plurality of optical fiber units. This improves easiness for dismantling the optical cable.

The filling may be wrapped around the outer circumference of the fiber group in an S-Z configuration without being joined to other members. Not having to have a function to bring the plurality of optical fibers together, the filling can be wrapped around the outer circumference of the fiber group in an S-Z configuration without being joined to other members.

A compression rate R may increase as a load P increases when the load P is 1 N or greater, where P(N) is a load applied to a winding member wound around an outer circumference of the filling, and R is a compression rate of the filling when the load P is applied to the winding member to give lateral pressure to the filling. This makes it possible for untwisting of the optical fiber units to be reduced.

When the load P is in a range from 1.5 N to 2.0 N, the compression rate R may increase as the load P increases. This makes it possible for untwisting of the optical fiber units to be reduced.

$\alpha$ may be 0.17 or greater, where $\alpha(N^{-1})$ is a ratio of an amount of increase in the compression rate R to an amount of increase in the load P when the load P is in a range from 1.5 N to 2.0 N. This makes it possible for untwisting of the optical fiber units to be reduced.

The filling may be configured to deform such that the compression rate R is 0.57 or greater, where P(N) is a load applied to a winding member wound around an outer circumference of the filling, and R is a compression rate of the filling when the load P is applied to the winding member to give lateral pressure to the filling. This makes it possible for untwisting of the optical fiber units to be reduced.

An optical cable manufacturing method will become apparent, comprising: inserting fiber groups into a plurality of respective insertion holes in a comber board; inserting a filling into at least one of the insertion holes in the comber board; and oscillating the comber board to wrap the filling around an outer circumference of the fiber group. According to such an optical cable manufacturing method, an optical cable can be manufactured in which untwisting of the optical fiber units is reduced with less fillings.

First Embodiments

<Configuration of an Optical Cable 1>

Figure 1B:
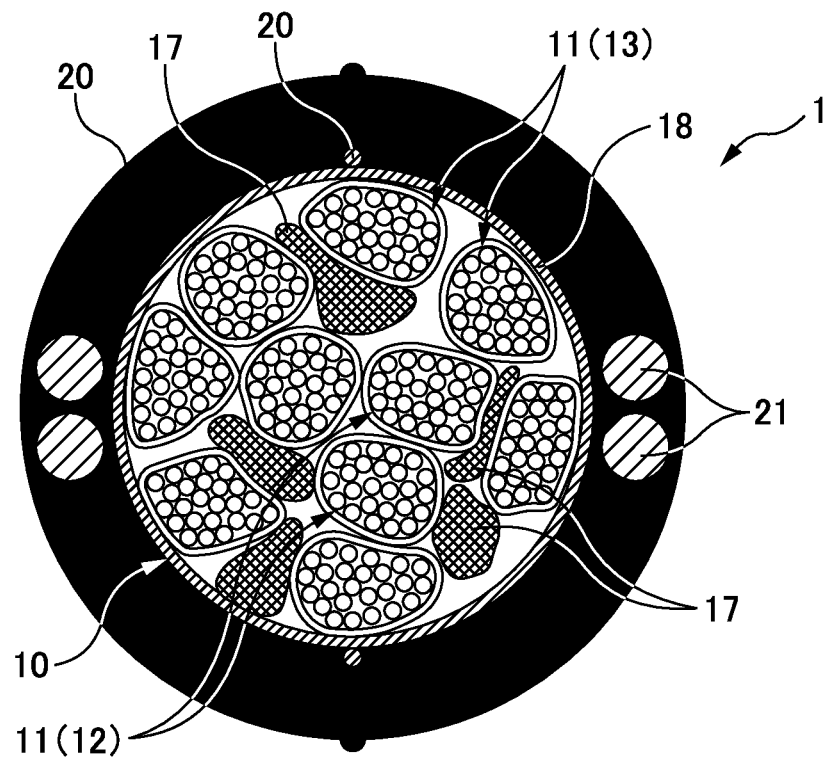

FIGS. 1A and 1B are diagrams illustrating an optical cable 1. For the sake of illustration, an optical fiber unit 11 having a distorted cross-sectional shape as shown in FIG. 1B may be depicted hereinbelow as having a circular cross section as shown in FIG. 1A. Similarly, a filling 17 having a distorted cross-sectional shape as shown in FIG. 1B may be depicted hereinbelow as having a clean cross section such as a circular or oval shape.

The optical cable 1 is a cable that houses optical fibers. The optical cable 1 of one or more embodiments is what is called a slot-less optical cable, which is an optical cable that does not have a slotted rod having slots (grooves for housing optical fibers) formed therein. Alternatively, the optical cable 1 may be a slotted optical cable having a slotted rod. The optical cable 1 has a core 10 and a sheath 20.

The core 10 is a member housed in the sheath 20. The core 10 has a plurality of optical fiber units 11 (11A to 11J) and a press-wrapping tape 18. Although the core 10 of one or more embodiments has ten optical fiber units 11 as shown in FIG. 1A (or FIG. 1B), the number of optical fiber units 11 is not limited to ten. Also, the core 10 of one or more embodiments is formed by the plurality of optical fiber units 11 twisted in an S-Z configuration together. The press-wrapping tape 18 is a member wrapping up the plurality of optical fiber units 11.

In one or more embodiments, the plurality of optical fiber units 11 forming the core 10 form an inner-layer unit 12 and an outer-layer unit 13. The inner-layer unit 12 is the optical fiber units 11 placed in a center portion of the core 10. The outer-layer unit 13 is the optical fiber units 11 placed outside the inner-layer unit 12. In one or more embodiments, the inner-layer unit 12 is formed by three optical fiber units 11, and the outer-layer unit 13 is formed by seven optical fiber units 11. However, the number of optical fiber units 11 forming the inner-layer unit 12 or the outer-layer unit 13 is not limited to the above. In the following description, the reference numerals for the optical fiber units 11 forming the inner-layer unit 12 may be followed by indices A to C, and the reference numerals for the optical fiber units 11 forming the outer-layer unit 13 may be followed by indices D to J. Also, in the following description, as to members associated with the optical fiber units 11 (e.g., insertion holes 441 in FIGS. 7A to 7C), their reference numerals may be followed by the same indices corresponding to the optical fiber units 11.

The sheath 20 is a member covering the plurality of optical fiber units 11 (and the press-wrapping tape 18). The outer shape of the sheath 20 is substantially circular in section here, but the outer shape of the sheath 20 is not limited to a circular shape. A tension member 21 is embedded in the sheath 20. Members other than the tension member 21 (e.g., a rip cord 22) may be embedded in the sheath 20 as well.

Figure 2A:
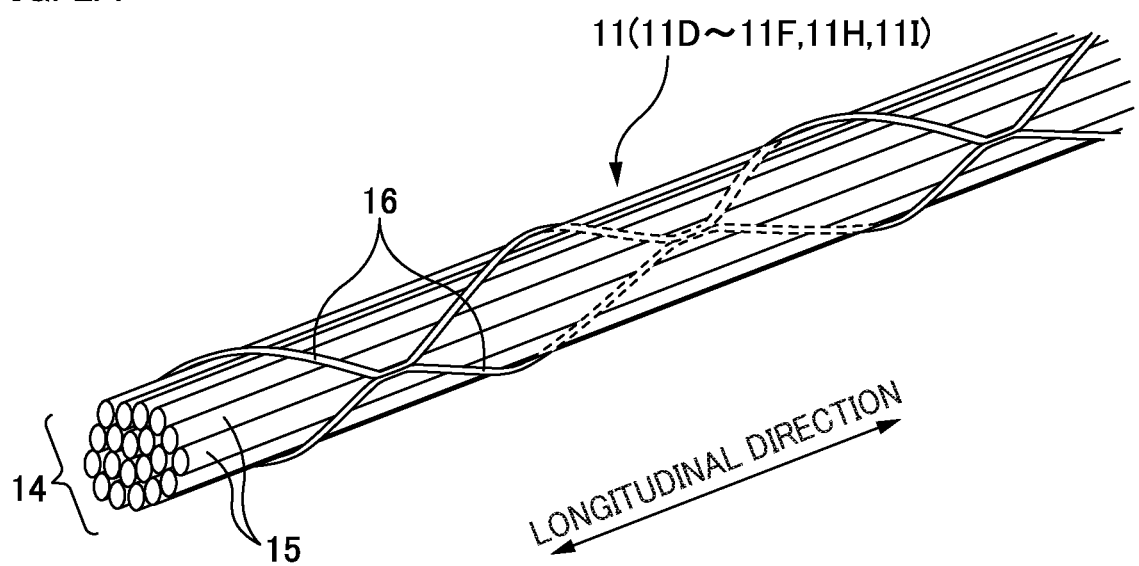
FIG. 2A is a diagram illustrating an optical fiber unit 11.

FIG. 2A is a diagram illustrating the optical fiber unit 11.

The optical fiber unit 11 is a structure formed by a plurality of optical fibers 15 brought together. The optical fiber unit 11 shown in FIG. 2A has a fiber group 14 and a bundling member 16. The fiber group 14 is a group of the plurality of optical fibers 15. In one or more embodiments, the fiber group 14 is formed by bringing together a plurality of intermittently-coupled optical fiber ribbons. However, the fiber group 14 does not have to be formed by a plurality of intermittently-coupled optical fiber ribbons, and for example, may be formed by a single intermittently-coupled optical fiber ribbon or a plurality of single optical fibers. The bundling member 16 is a member that bundles the plurality of optical fibers 15 forming the fiber group 14. The bundling member 16 is wrapped around the outer circumference of the fiber group 14. The plurality of optical fibers 15 forming the fiber group 14 are thus brought together so as not to come apart. In one or more embodiments, the optical fiber unit 11 has a pair of bundling members 16, and the bundling members 16 are wrapped around the outer circumference of the fiber group 14 in an S-Z configuration in such a manner that their wrapping directions are reversed at points where they are joined. However, the bundling members 16 are not limited to being wrapped in an S-Z configuration and may be wrapped around the outer circumference of the fiber group 14 in one direction helically. Also, the number of bundling members 16 is not limited to two. Also, in a case where the optical fiber unit 11 is formed by a single intermittently-coupled optical fiber ribbon, the optical fiber unit 11 does not need to include the bundling members 16 because the group of the optical fibers 15 would not come apart.

Figure 2B:
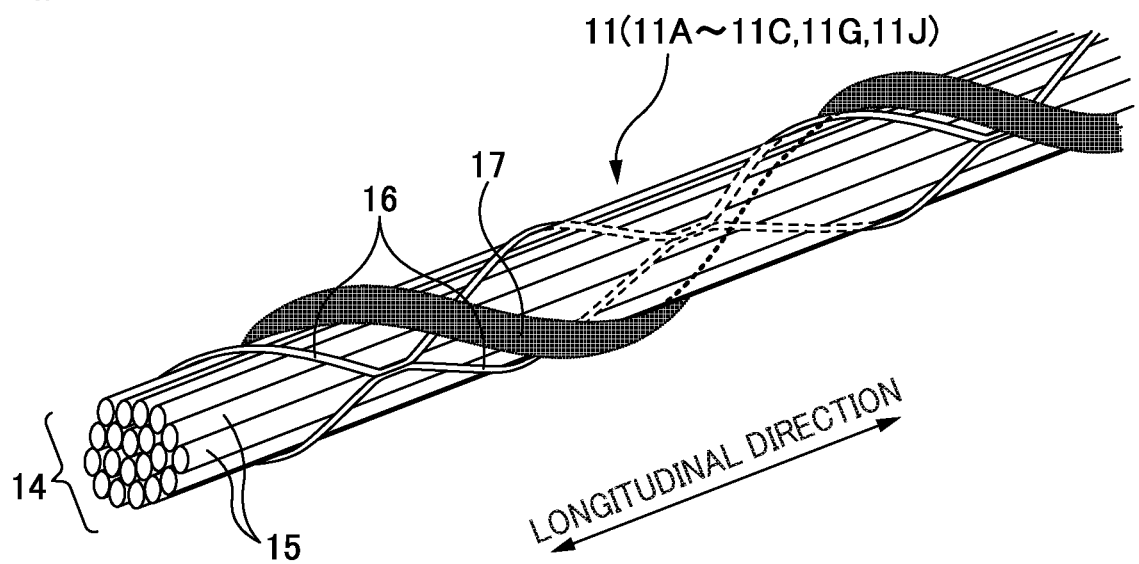
FIG. 2B is a diagram illustrating another optical fiber unit 11.

FIG. 2B is a diagram illustrating another optical fiber unit 11.

Some optical fiber units 11 (11A to 11C, 11G, 11J; see FIG. 1A) of one or more embodiments further include the filling 17.

The filling 17 is a member that fills a gap in the space inside the optical cable 1. Placing the fillings 17 inside the optical cable 1 can increase the packaging density of the optical fibers 15. Note that the packaging density of the optical fibers 15 is the ratio of the cross-sectional areas of the plurality of optical fibers 15 to an area obtained by subtracting the cross-sectional areas of members other than the optical fibers 15 (such as the press-wrapping tape 18, the bundling members 16, and the fillings 17) from the entire cross-sectional area of the space inside the optical cable 1. Specifically, the packaging density of the optical fibers 15 is expressed as $\rho = Sf/(S0-S1)$, where S0 is the entire cross-sectional area of the space inside the optical cable 1, S1 is the sum of the cross-sectional areas of the members inside the optical cable 1 other than the optical fibers 15 (such as the press-wrapping tape 18, the bundling members 16, and the fillings 17), Sf is the sum of the cross-sectional areas of the optical fibers 15 inside the optical cable 1, and $\rho$ is the packaging density of the optical fibers 15.

A low packaging density of the optical fibers 15 means many voids in the space inside the optical cable 1, and therefore there is a concern that the plurality of optical fiber units 11 twisted in an S-Z configuration may move in untwisting directions. In other words, in a case where the packaging density of the optical fibers 15 is low, "untwisting" of the optical fiber units 11 may occur. Meanwhile, placing too many fillings 17 inside the optical cable 1 to reduce the "untwisting" increases lateral pressure acting on the optical fibers 15 and may increase microbending losses of the optical fibers 15. In particular, low-loss optical fibers employed to increase the length of the transmission section of the optical cable 1 (e.g., optical fibers having low-loss characteristics conforming to ITU-T G.654.E) have microbending characteristics inferior to those of optical fibers conforming to ITU-T G.657.A1. Thus, placing many fillings 17 inside the optical cable 1 employing such optical fibers makes it likely to increase the microbending losses. For this reason, as will be described next, one or more embodiments reduce the "untwisting" of the optical fiber unit 11 with less fillings 17.

The filling 17 of one or more embodiments is an elongated member and is wrapped around the outer circumference of the fiber group 14 in the longitudinal direction in a helical or S-Z configuration. The filling 17 of one or more embodiments is a cord-shaped member, but is not limited to a cord shape and may be, for example, a ribbon shape. Although the filling 17 of one or more embodiments is formed by a polypropylene cord, the material of the filling 17 is not limited to polypropylene and may be a different material. For example, the filling 17 may be a water-absorbent member such as a water-absorbent yarn. When the filling 17 is water-absorbent, water running inside the optical cable 1 can be reduced. In FIG. 2B, the filling 17 is wrapped around the outer circumference of the fiber group 14 in one direction helically. Alternatively, the filling 17 may be wrapped around the outer circumference of the fiber group 14 in an S-Z configuration by being reversed in its wrapping direction midway.

The filling 17 may be a member which has a higher cushioning property than the bundling member 16. Thus, the filling 17 is a member whose cross-sectional shape largely changes when receiving lateral pressure (by contrast, the bundling member 16 is a member with a small amount of deformation and its cross-sectional area deforms very little when receiving lateral pressure). Also, the filling 17 has properties such that its cross-sectional shape deforms even with a small lateral pressure and is easily restored to the original form when the lateral pressure is removed (a high restoration rate). Even if the space inside the optical cable 1 deforms when the cable is bent, the filling 17 having such a cushioning property can follow the deformation of the internal space and keep filling a gap inside the optical cable 1. Thus, the filling 17 can maintain the postures of the members in the space inside the optical cable 1 (e.g., the optical fiber units 11) and reduce the "untwisting" of the optical fiber units 11.

Although FIG. 2B depicts that the optical fiber units 11 (and the fiber groups 14) extend linearly in the longitudinal direction, the longitudinal directions of the optical fiber units 11 extend in an S-Z configuration along the longitudinal direction of the optical cable 1 because the plurality of optical fiber units 11 are twisted together inside the optical cable 1 in one or more embodiments. In other words, the optical fiber units 11 (and the fiber groups 14) are placed inside the optical cable 1 in an S-Z configuration in the longitudinal direction, and the filling 17 of one or more embodiments is wrapped in a helical or S-Z configuration along the longitudinal direction of such an S-Z configuration fiber group 14.

Figure 3:
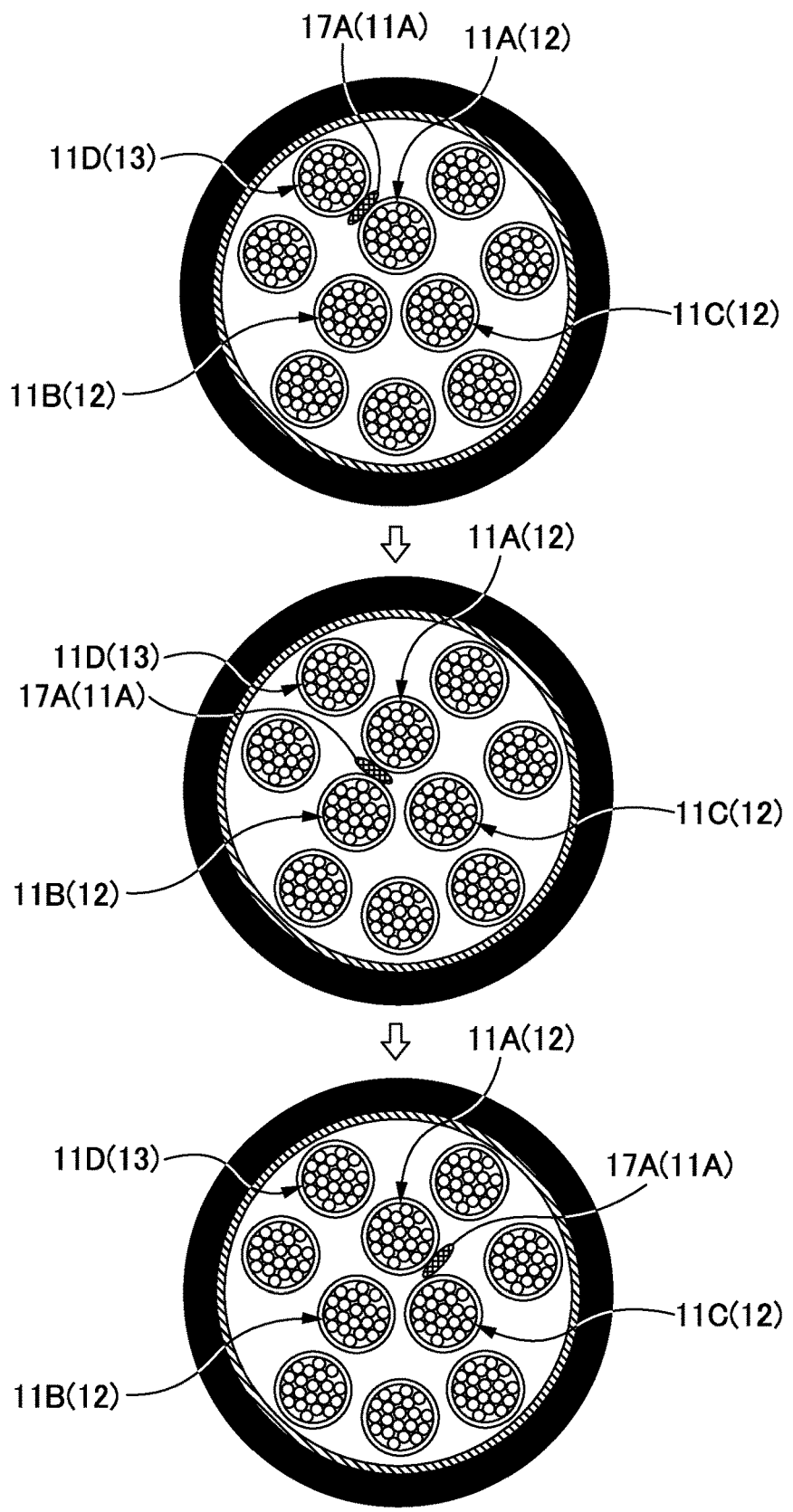
FIG. 3 is a diagram illustrating the placement of a filling 17A for a given optical fiber unit 11A.

FIG. 3 is a diagram illustrating the placement of the filling 17A for a given optical fiber unit 11A. Only the filling 17A for the given optical fiber unit 11A is shown here, and the fillings 17 for the other optical fiber units 11 are not shown. FIG. 3 shows cross sections of the optical cable 1 at different locations in the longitudinal direction of the optical cable 1. Note that FIG. 3 is depicted with the circumferential position of the cross section of the optical cable 1 being changed so that the plurality of optical fiber units 11 inside the optical cable 1 may be at the same positions (because the plurality of optical fiber units 11 are twisted in an S-Z configuration inside the optical cable 1 in one or more embodiments, the positions of the optical fiber units 11 on a cross section of the optical cable 1 are different depending on the longitudinal position of the optical cable 1).

In one or more embodiments, the filling 17 is wrapped around the outer circumference of the fiber group 14 in the longitudinal direction in a helical or S-Z configuration (see FIG. 2B). Thus, as shown in FIG. 3, the filling 17A for the given optical fiber unit 11A can be adjacent not only to a particular optical fiber unit 11 but also to the neighboring other optical fiber units 11. For example, the filling 17A for the given optical fiber unit 11A shown in FIG. 3 is, in a certain cross section, adjacent to the optical fiber unit 11D of the outer-layer unit 13 and is, in another cross section, adjacent to the optical fiber unit 11B of the inner-layer unit 12. In this way, the filling 17A for the given optical fiber unit 11A shown in FIG. 3 is adjacent to a plurality of different optical fiber units 11. Similarly, the fillings 17 for the other optical fiber units 11 are also adjacent to a plurality of different optical fiber units 11 by being wrapped around the outer circumferences of the fiber groups 14 in the longitudinal direction in a helical or S-Z configuration. The filling 17 for a given optical fiber unit 11 thus being adjacent to a plurality of neighboring different optical fiber units 11 means that the filling 17 is adjacent to many optical fiber units 11. The filling 17 helps the optical fiber units 11 that are adjacent to the filling 17 maintain their postures (postures twisted in an S-Z configuration) and therefore can inhibit "untwisting" of the optical fiber units 11 by being adjacent to many optical fiber units 11. In other words, one or more embodiments can reduce the "untwisting" of the optical fiber units 11 with less fillings 17 by wrapping the filling 17 around the outer circumference of the fiber group 14 in the longitudinal direction in a helical or S-Z configuration.

Also, in one or more embodiments, as shown in FIG. 2B, the filling 17 is wrapped around the outer side of the bundling member 16. This makes the filling 17 come easily into contact with the neighboring optical fiber units 11 compared to a case where the filling 17 is placed to the inner side of the bundling member 16, and for this reason, thus one or more embodiments can further reduce the "untwisting" of the optical fiber units 11.

As shown in FIG. 1A, in one or more embodiments, not all the optical fiber units 11 have the filling 17, and there are both optical fiber units 11 having the filling 17 (11A to 11C, 11G, 11J; see FIG. 2B) and optical fiber units 11 not having the filling 17 (11D to 11F, 11H, 11I; see FIG. 2A). Thus, compared to a case where all the optical fiber units 11 have the filling 17, the fillings 17 inside the optical cable 1 can be decreased. Note that the "untwisting" of the optical fiber units 11 not having the filling 17 is reduced because the optical fiber units 11 not having the filling 17 are adjacent to the fillings 17 for the adjacent optical fiber units 11, and for this reason, it is permissible that some of the optical fiber units 11 do not have the filling 17. However, all the optical fiber units 11 may have the filling 17.

Also, in one or more embodiments, as shown in FIG. 1A, the three optical fiber units 11 (11A to 11C) forming the inner-layer unit 12 each have the filling 17. The optical fiber units 11 forming the inner-layer unit 12 have more adjacent optical fiber units 11 therearound than the optical fiber units 11 (11D to 11J) forming the outer-layer unit 13. Thus, when the optical fiber units 11 forming the inner-layer unit 12 have the fillings 17 like in one or more embodiments, the fillings 17 are adjacent to many optical fiber units 11. This helps the optical fiber units 11 maintain their postures twisted in an S-Z configuration and thus helps reduce the "untwisting" of the optical fiber units 11. However, the optical fiber units 11 forming the inner-layer unit 12 do not have to have the filling 17.

Further, in one or more embodiments, as shown in FIG. 1A, the outer-layer unit 13 includes both optical fiber units 11 having the filling 17 and optical fiber units 11 not having the filling 17. This can decrease the fillings 17 inside the optical cable 1. Note that because the optical fiber units 11 of the inner-layer unit 12 have the filling 17 in one or more embodiments, even if some of the optical fiber units 11 of the outer-layer unit 13 do not have the filling 17, those optical fiber units 11 of the outer-layer unit 13 are at least adjacent to the fillings 17 for the optical fiber units 11 of the inner-layer unit 12, and therefore the "untwisting" of the optical fiber units 11 of the outer-layer unit 13 can be reduced.

Note that, in a case where the outer-layer unit 13 has both optical fiber units 11 having the filling 17 and optical fiber units 11 not having the filling 17, each optical fiber unit 11 not having the filling 17 may be placed circumferentially between two optical fiber units 11 having the filling 17. This helps reduce "untwisting" of the optical fiber units 11 even with less fillings 17 inside the optical cable 1, compared to a case where two optical fiber units 11 having the filling 17 are adjacent circumferentially in the outer-layer unit 13.

Incidentally, in a case where the filling 17 is wrapped around the fiber group 14, if the filling 17 is wrapped at a small pitch, the work for removing the filling 17 becomes cumbersome, which may make branching work for the optical cable 1 time-consuming. In this respect, a plurality of types of optical cables 1 were created each with a different P1/P2, where P1 is the pitch of wrapping the filling 17 and P2 is the pitch of twisting the plurality of optical fiber units 11, and dismantlement easiness was evaluated for each of the optical cables 1. Note that the wrapping pitch P1 of the filling 17 is the longitudinal length of the fiber group 14 over which the filling 17 helically wrapped around the outer circumference of the fiber group 14 makes a full circle circumferentially around the outer circumference of the fiber group 14. Also, the twisting pitch P2 is the longitudinal length of the optical cable 1 between reversion of the twisting direction of the optical fiber units 11 twisted in an S-Z configuration and next reversion of the twisting direction of the optical fiber units 11 in the same direction. The optical cables 1 created had the structure shown in FIG. 1A (or FIG. 1B) and were each formed by twisting in an S-Z configuration ten optical fiber units 11 each formed by five intermittently-coupled four-fiber optical fiber ribbons. Also, five of the ten optical fiber units 11 had the filling 17 wrapped therearound helically. The dismantlement easiness for the optical cable 1 in which the filling 17 was not wrapped around the fiber group 14 but laid longitudinally therealong (P1 is infinity) was used as a reference, and the dismantlement easiness was evaluated for each of the optical cables 1 as "excellent" when the dismantlement easiness was almost the same, "good" when the dismantlement easiness was unproblematic, and "passable" when the dismantlement was possible but time-consuming.

FIG. 4 is a table showing the evaluation results of the dismantlement easiness for the optical cables 1. As shown in FIG. 4, P1/P2 may be 0.1 or greater (P1/P2≥0.1). Further, P1/P2 may be 0.5 or greater (P1/P2≥0.5).

Note that the filling 17 may be wrapped around the outer circumference of the fiber group 14 in an S-Z configuration instead of being wrapped around the outer circumference of the fiber group 14 helically. When the filling 17 is wrapped around the outer circumference of the fiber group 14 in an S-Z configuration, the work for removing the filling 17 would be easier than in a case where the filling 17 is wrapped helically. Further, the filling 17 may be wrapped around the outer circumference of the fiber group 14 in an S-Z configuration without being joined to other members (e.g., another filling 17 in a case where the optical fiber unit 11 has two or more fillings 17). This facilitates the work for removing the filling 17. Note that it is possible to form the optical fiber unit 11 by wrapping the filling 17 around the outer circumference of the fiber group 14 in an S-Z configuration without the filling 17 being joined to other members because the filling 17 does not need to have a function to bring together the plurality of optical fibers 15 unlike the bundling member 16. Also, because the filling 17 does not need to have a function to bring together the plurality of optical fibers 15 unlike the bundling member 16, the number of the fillings 17 wrapped around the outer circumference of the fiber group 14 of the optical fiber unit 11 may be one, and that single filling 17 may be wrapped around the outer circumference of the fiber group 14 in an S-Z configuration. The bundling member 16, when wrapped around in an S-Z configuration, is joined to another corresponding bundling member 16 in order to bundle the plurality of optical fibers 15, whereas the number of fillings 17 can be one even when the filling 17 is wrapped around in an S-Z configuration. This helps decrease the number of fillings 17 included in the optical cable 1.

As thus described above, the optical cable 1 of one or more embodiments includes a plurality of optical fiber units 11 each having the fiber group 14 formed by a plurality of optical fibers 15, and the plurality of optical fiber units 11 are twisted together in an S-Z configuration with the filling 17 being wrapped around the outer circumference of at least one fiber group 14. According to the optical cable 1 having such a configuration, as shown in FIG. 3, the filling 17 can be adjacent to a plurality of neighboring different optical fiber units 11. Thus, the filling 17 helps the optical fiber units 11 adjacent to the filling 17 maintain their postures twisted in an S-Z configuration. As a result, the "untwisting" of the optical fiber units 11 can be reduced with less fillings 17. Although five optical fiber units 11 include the filling 17 in the embodiments described above, the "untwisting" of the optical fiber units 11 can be reduced with less fillings 17 as long as at least one of the plurality of optical fiber units 11 includes the filling 17 and the filling 17 is wrapped around the outer circumference of the fiber group 14.

<Manufacturing Method>

Figure 5:
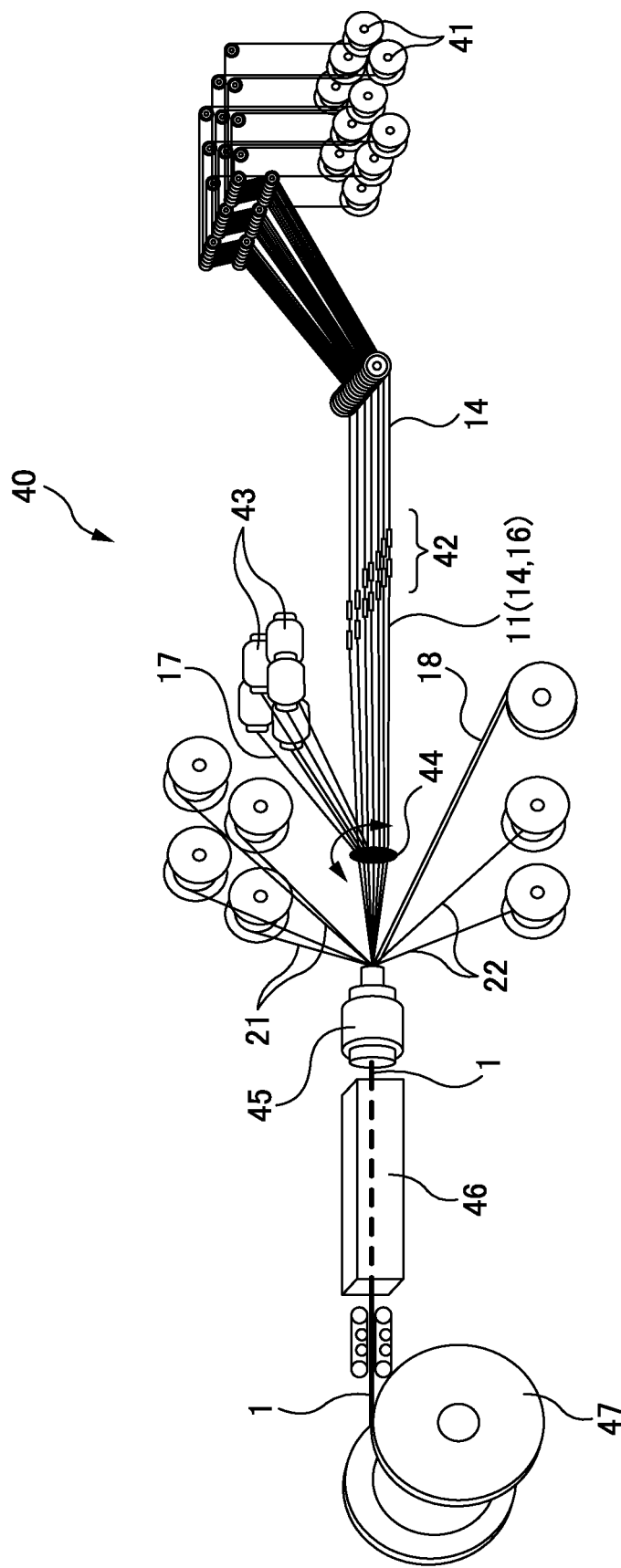
FIG. 5 is a diagram illustrating a manufacturing system 40 for the optical cable 1.

FIG. 5 is a diagram illustrating a manufacturing system 40 for the optical cable 1. The manufacturing system 40 has fiber supply sections 41, bundling apparatuses 42, filling supply sections 43, a comber board 44, an extrusion molding section 45, and a take-up section 47.

The fiber supply sections 41 are apparatuses (supply sources) configured to supply the optical fibers 15. In one or more embodiments, the fiber supply sections 41 are each an apparatus (a supply source) configured to supply an intermittently-coupled optical fiber ribbon and is capable of supplying a plurality of optical fibers 15. Specifically, the fiber supply section 41 is formed of a drum (or a bobbin) around which an intermittently-coupled optical fiber ribbon is wound in advance. Note that the fiber supply section 41 may be formed of an apparatus that manufactures an intermittently-coupled optical fiber ribbon. In one or more embodiments, optical fiber ribbons supplied from the fiber supply sections 41 are supplied as the fiber group 14 to the bundling apparatus 42.

The bundling apparatuses 42 are each an apparatus configured to wrap the bundling member 16 around the outer circumference of the fiber group 14. In one or more embodiments, the bundling apparatus 42 wraps two bundling members 16 in an S-Z configuration in opposite directions from each other while joining the two bundling members 16 at locations where the wrapping directions are reversed. Alternatively, the bundling apparatus 42 may wrap the bundling member 16 around the outer circumference of the fiber group 14 in one direction helically. As a result of the bundling apparatus 42 wrapping the bundling members 16 around the fiber group 14, the optical fiber unit 11 shown in FIG. 2A is formed. Note that the bundling apparatus 42 may be omitted in a case where the optical fiber unit 11 is formed without the bundling members 16.

The filling supply sections 43 are each an apparatus (a supply source) configured to supply the filling 17. For example, the filling supply section 43 is formed of a drum (or a bobbin) around which the filling 17 is wound in advance.

Figure 6A:
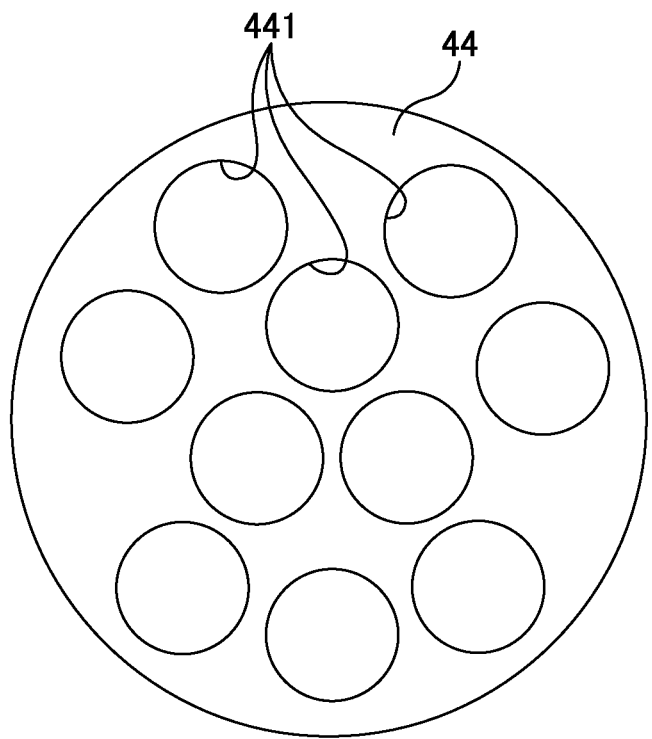
FIGS. 6A and 6B are diagrams illustrating a comber board 44.
Figure 6B:
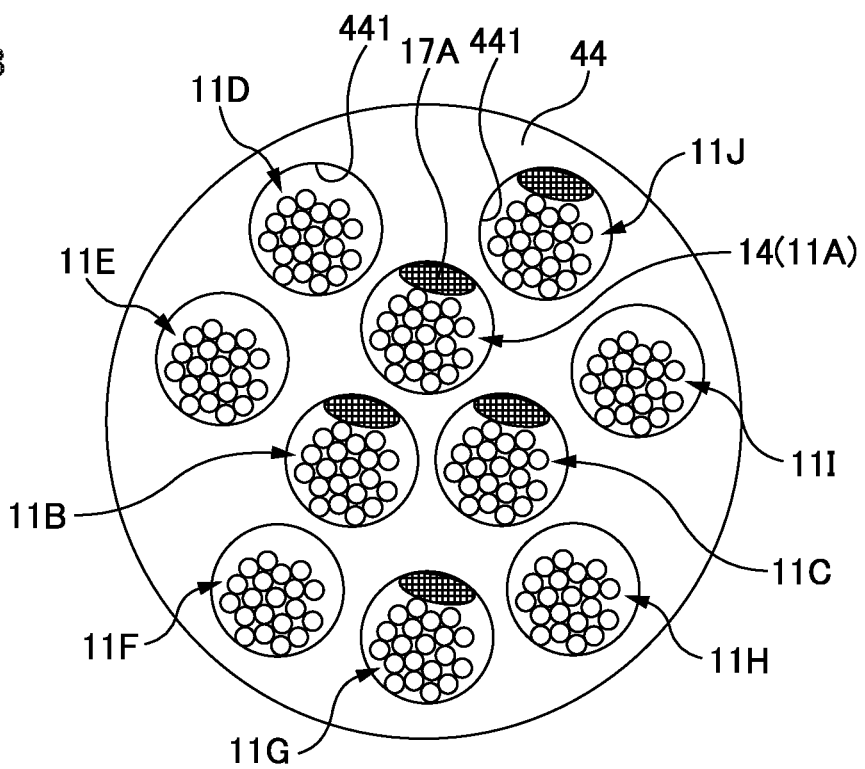

FIGS. 6A and 6B are diagrams illustrating the comber board 44. FIG. 6A is a diagram illustrating the comber board 44. FIG. 6B is a diagram illustrating a state where the optical fiber units 11 (the fiber groups 14 and the bundling members 16) and the fillings 17 are inserted through the insertion holes 441 in the comber board 44.

The comber board 44 is a plate-shaped member having the plurality of insertion holes 441. The insertion holes 441 are through-holes penetrating through the comber board 44 and are holes for inserting the fiber groups 14 and the fillings 17. In one or more embodiments, the insertion holes 441 are formed in a circular shape. Toward the respective insertion holes 441 in the comber board 44, the optical fiber units 11 (the fiber groups 14) are supplied from the bundling apparatuses 42, while the fillings 17 are supplied from the filling supply sections 43. As shown in FIG. 5, the direction in which the optical fiber units 11 are supplied to the comber board 44 and the direction in which the fillings 17 are supplied to the comber board 44 are different. Specifically, the direction in which the optical fiber units 11 are supplied to the comber board 44 is almost perpendicular to the comber board 44, whereas the direction in which the fillings 17 are supplied to the comber board 44 is oblique to the direction perpendicular to the comber board 44.

The comber board 44 is oscillated about its center rotation axis with the fiber groups 14 and the fillings 17 being inserted through the insertion holes 441. By the oscillating of the comber board 44, the plurality of optical fiber units 11 are twisted together in an S-Z configuration. The comber board 44 of one or more embodiments also has a function to place the fillings 17 around the outer circumference of the fiber groups 14 in an S-Z configuration by oscillating.

Figure 7A:
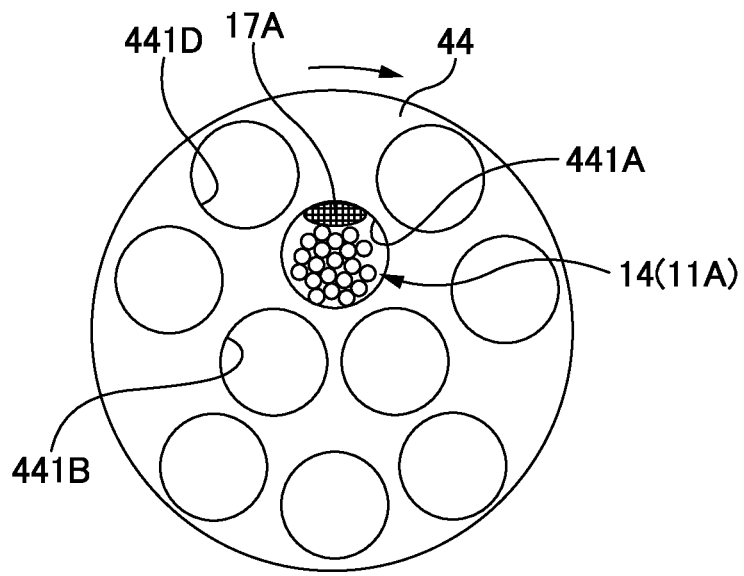
FIGS. 7A to 7C are diagrams illustrating how the comber board 44 rotates.
Figure 7B:
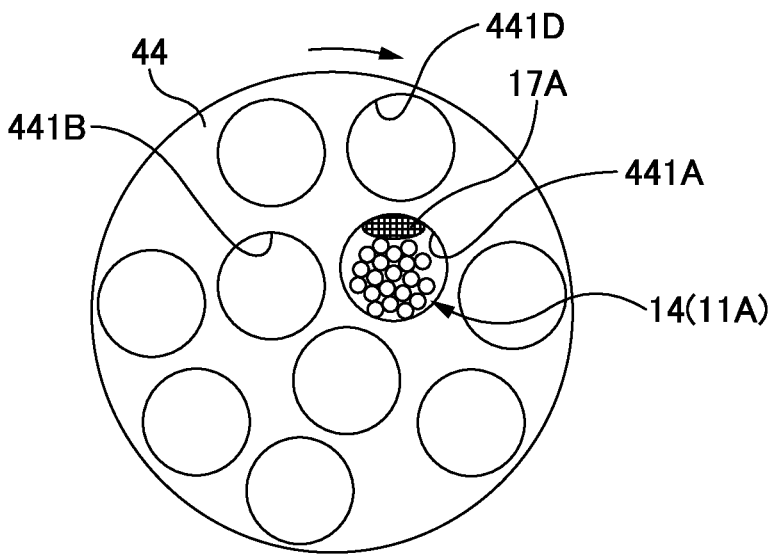
Figure 7C:
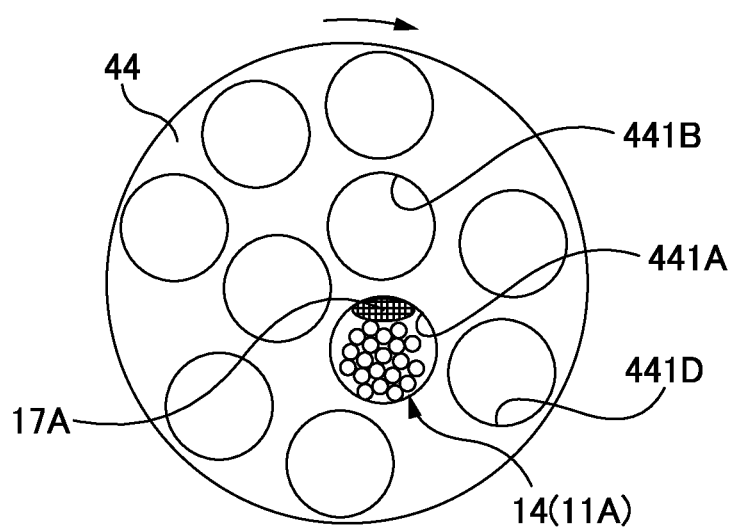

FIGS. 7A to 7C are diagrams illustrating how the comber board 44 rotates. Here, for the sake of illustration, FIGS. 7A to 7C show a state where only one insertion hole 441A has the fiber group 14 and the filling 17A inserted therethrough.

As shown in FIGS. 7A to 7C, by the oscillating of the comber board 44, the circumferential position of the fiber group 14 changes. As a result, the fiber group 14 (the optical fiber unit 11A) is placed in an S-Z configuration in the longitudinal direction inside the optical cable 1.

As already described, in one or more embodiments, the direction in which the filling 17 is supplied to the comber board 44 is oblique to the direction perpendicular to the comber board 44. This helps the filling 17 to be placed, inside the insertion hole 441, toward the side where the filling supply section 43 is. For example, the filling supply section 43 (see FIG. 5) for the filling 17 shown in FIGS. 7A to 7C is placed upward of the insertion hole 441 in the comber board 44 as seen in FIG. 5, which consequently helps the filling 17A shown in FIGS. 7A to 7C to be placed, inside the insertion hole 441A, toward the upper side (the upper edge) of the insertion hole 441. In one or more embodiments, by oscillating of the comber board 44 with the filling 17 thus being placed toward a particular direction inside the insertion hole 441, the filling 17 can be wrapped around the outer circumference of the fiber group 14 in the longitudinal direction in an S-Z configuration.

Note that in one or more embodiments, the insertion holes 441 are formed in a circular shape. Thus, when the comber board 44 is oscillated as shown in FIGS. 7A to 7C, the fiber group 14 and the filling 17 can easily slide against the rim of the insertion hole 441 circumferentially (the direction along the rim of the insertion hole 441), which helps the filling 17 to be placed toward a particular direction (the upper side here) inside the insertion hole 441. However, the shape of the insertion holes 441 does not have to be a circular shape and may be other shapes as long as the filling 17 can be placed toward a particular direction inside the insertion hole 441.

Also, in one or more embodiments, by oscillating of the comber board 44 with the fillings 17 placed inside the insertion holes 441 in positions toward a particular direction, each filling 17 can be adjacent not only to a particular optical fiber unit 11, but also to neighboring other optical fiber units 11. For example, the filling 17A shown in FIG. 7A can, in the state shown in FIG. 7B, come adjacent to the optical fiber unit 11D (not shown in FIG. 7B; see FIG. 3) inserted through the insertion hole 441D and can, in the state shown in FIG. 7C, come adjacent to the optical fiber unit 11B (not shown in FIG. 7C; see FIG. 3) inserted through the insertion hole 441B. Similarly, the fillings 17 inserted through other insertion holes 441 can come adjacent to a plurality of different optical fiber units 11 when the comber board 44 is oscillated with the fillings 17 placed toward a particular direction inside the insertion holes 441.

As shown in FIG. 5, the plurality of optical fiber units 11 having passed through the comber board 44 are supplied to the extrusion molding section 45 in the state of being twisted in an S-Z configuration. The extrusion molding section 45 is supplied not only with the plurality of optical fiber units 11, but also with other members such as the press-wrapping tape 18, the tension member 21, and the rip cord 22.

The extrusion molding section 45 is an apparatus that forms the sheath 20. In the extrusion molding section 45, the press-wrapping tape 18 is wrapped around the plurality of optical fiber units 11, and a resin to be the sheath 20 is extruded, thereby manufacturing the optical cable 1 of one or more embodiments shown in FIG. 1A (or FIG. 1B). The optical cable 1 manufactured by the extrusion molding section 45 is cooled by a cooling apparatus 46 and is then taken up by the take-up section 47 (e.g., a drum).

As thus described, the method for manufacturing the optical cable 1 of one or more embodiments performs inserting the fiber groups 14 into the respective plurality of insertion holes 441 in the comber board 44, inserting the filling 17 into at least one of the insertion holes 441 in the comber board 44, and oscillating the comber board 44 to wrap the filling 17 around the outer circumference of at least one of the fiber groups 14. Such a manufacturing method can manufacture the optical cable 1 while reducing the "untwisting" of the optical fiber units 11 with less fillings 17.

Figure 8:
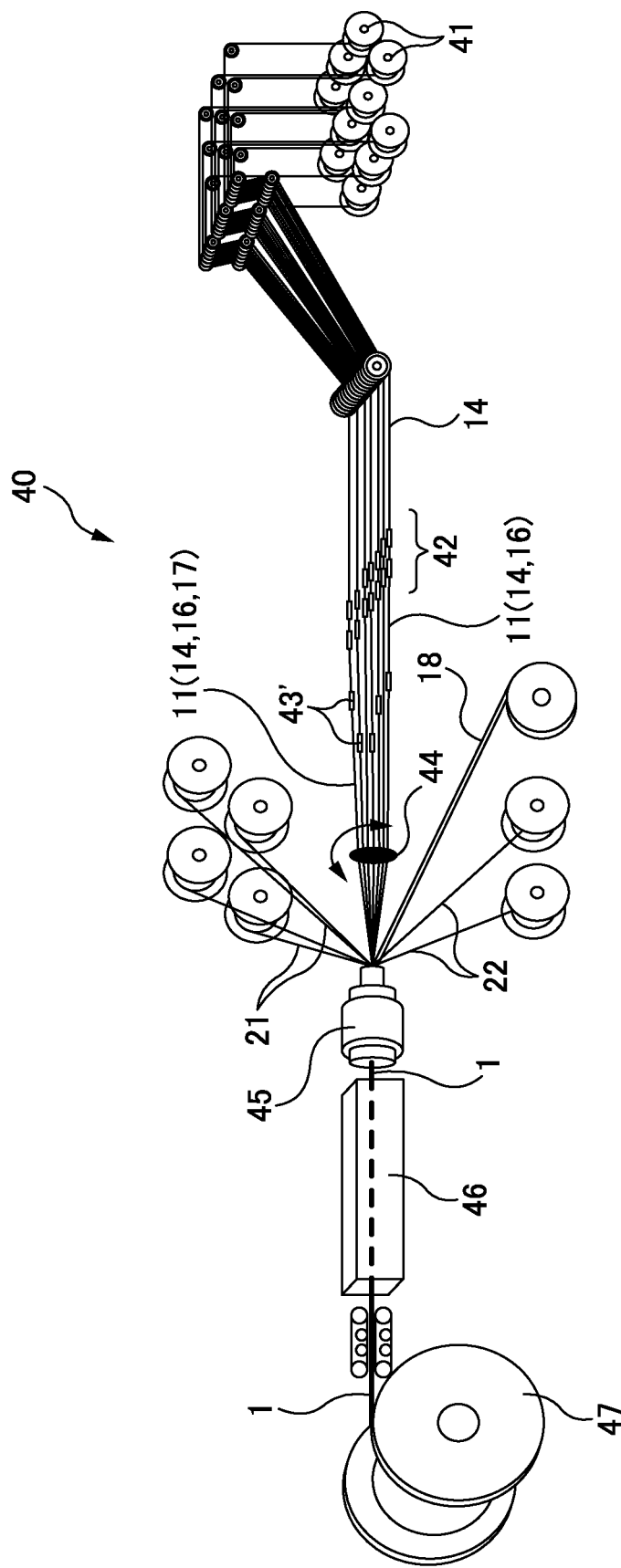
FIG. 8 is a diagram illustrating a manufacturing system 40 of a modification.

FIG. 8 is a diagram illustrating a manufacturing system 40 of a modification. The manufacturing system 40 of the modification has the fiber supply sections 41, the bundling apparatuses 42, filling wrapping sections 43', the comber board 44, the extrusion molding section 45, and the take-up section 47. Compared to the manufacturing system 40 shown in FIG. 5, the manufacturing system 40 of the modification has the filling wrapping sections 43' in place of the above-described filling supply sections 43 (see FIG. 5). The filling wrapping sections 43' are each an apparatus that wraps the filling 17 around the outer circumference of the fiber group 14. Here, the filling wrapping section 43' is an apparatus that wraps the filling 17 around the outer circumference of the fiber group 14 helically. The filling 17 may be wrapped around the outer circumference of the fiber group 14 in an S-Z configuration as long as the filling 17 does not come off.

In the modification as well, the comber board 44 is oscillated about its center rotation axis with the fiber groups 14 and the filling 17 inserted through the insertion holes 441. By the oscillating of the comber board 44, the plurality of optical fiber units 11 are twisted together in an S-Z configuration. In the modification, the plurality of optical fiber units 11 are twisted together in an S-Z configuration with the filling 17 being wrapped around the outer circumference of the fiber group 14 in a helical or S-Z configuration. For this reason, in the modification, it is easier to separately set the pitch P1 for wrapping the filling 17 and the pitch P2 for twisting the plurality of optical fiber units 11.

<Cushioning Property of the Filling 17>

As already described, the filling 17 is a member whose cross-sectional shape changes greatly when receiving lateral pressure. A compression rate is an example of an index indicating a change in cross-sectional shape upon receipt of lateral pressure. A compression rate R of a member can be expressed as follows, where D1 (mm) is the diameter of the member before receiving lateral pressure and D2 (mm) is the diameter of the member when receiving lateral pressure.

$$R=(D1-D2)/D2$$

Also, a compression rate R of a member can be expressed as follows, where L1 (mm) is the length of the outer circumference of the member before receiving lateral pressure (an initial circumferential length) and L2 (mm) is the length of the outer circumference of the member when receiving lateral pressure (a circumferential length).

$$R=(L1-L2)/L2$$

Figure 9A:
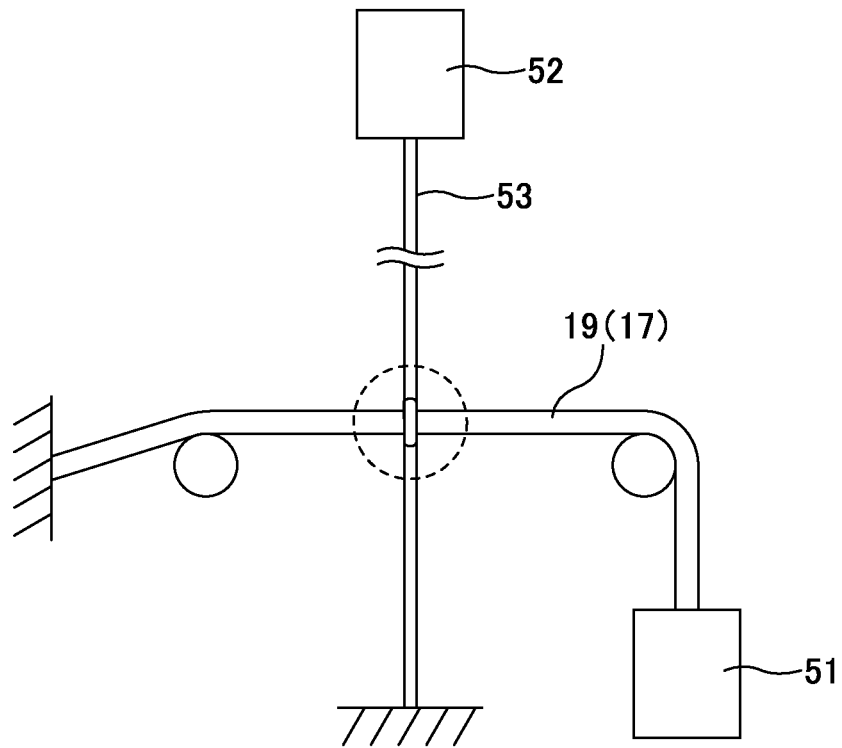
FIG. 9A is a diagram illustrating how a compression rate R is measured.
Figure 9B:
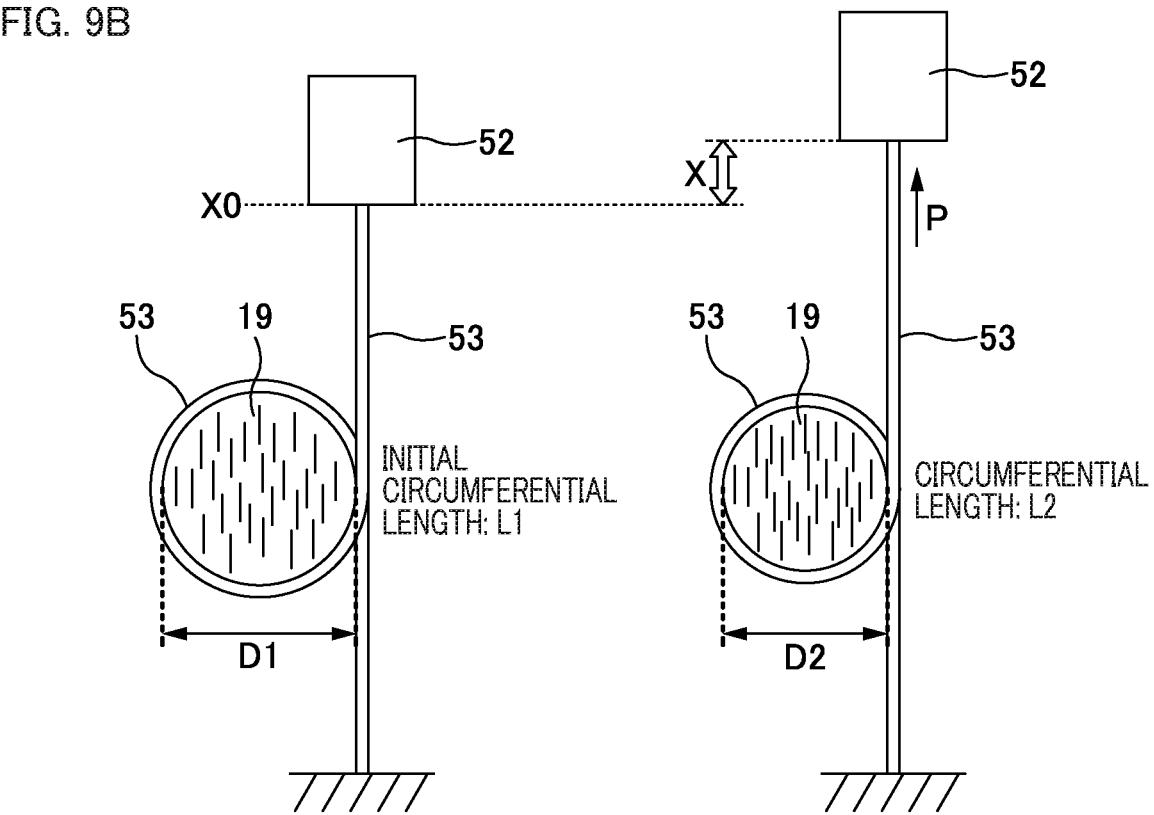
FIG. 9B is a diagram illustrating how the cross-sectional shape changes between before and after giving lateral pressure.

FIG. 9A is a diagram illustrating how the compression rate R is measured. FIG. 9B is a diagram illustrating how a cross-sectional shape changes before and after reception of lateral pressure.

As shown in FIG. 9A, a tension is given to a member to be measured 19 (e.g., the filling 17) while securing one end of the member to be measured 19 and attaching a weight to the other end thereof. Here, a 200 g weight is given (a tension of approximately 2 N is given) so that the same tension as that exerted to the filling 17 inside the optical cable 1 may be exerted.

The left side of FIG. 9B shows a state before a load is applied to a winding member 53. The right side of FIG. 9B shows a state where a load is being applied to the winding member 53.

As shown in FIGS. 9A and 9B, the cord-shaped winding member 53 is wound around the outer circumference of the member to be measured 19 (e.g., the filling 17). Also, as shown in FIGS. 9A and 9B, one end of the member to be measured 19 is secured, and the other end thereof has a measurement apparatus 52 attached thereto. The measurement apparatus 52 measures a load P(N) applied to the winding member 53 and a displacement X (mm) of an end portion of the winding member 53 relative to a reference position X0.

As shown in FIG. 9A, at the reference position X0 before the application of a load to the winding member 53, the member to be measured 19 has the initial circumferential length L1 and the diameter D1. As shown in FIG. 9B, once the load P (a tensile load) is applied to the winding member 53, lateral pressure is evenly given to the outer circumference of the member to be measured 19, and the cross-sectional shape of the member to be measured 19 is compressively deformed, so that the member to be measured 19 has the circumferential length L2 and the diameter D2 (the member to be measured 19 becomes denser). As shown in FIG. 9B, when a load is applied to the winding member 53, an end portion of the winding member 53 is displaced. By measuring the displacement X of the end portion of the winding member 53 relative to the reference position X0 using the measurement apparatus 52, the circumferential length L2 (or the diameter D2) of the member to be measured 19 can be measured, and the compression rate R can thus be calculated.

FIG. 10 is measurement results of the compression rates of fillings, a bundling member, and Kevlar. Here, three types of fillings (fillings 1 to 3), a bundling member, and Kevlar were measured as members to be measured. Note that in optical cables formed by wrapping the bundling member or Kevlar, which is a measurement target, around the outer circumferences of the optical fiber units, untwisting of the plurality of twisted optical fiber units occurred, whereas in optical cables formed by wrapping the filling (fillings 1 to 3), which is a measurement target, around the outer circumferences of the optical fiber units, untwisting of the plurality of optical fiber units was reduced. The fillings 2, 3 are water-absorbent fillings, or more specifically, water-absorbent yarns. Also, here, the applied load P was varied in the range from 0.0 N to 2.5 N, and as shown in FIG. 9B, the circumferential length L2 when the load P was applied to the winding member 53 was measured, and then the compression rate R was measured based on the initial circumferential length L1 and the circumferential length L2.

Figure 11:
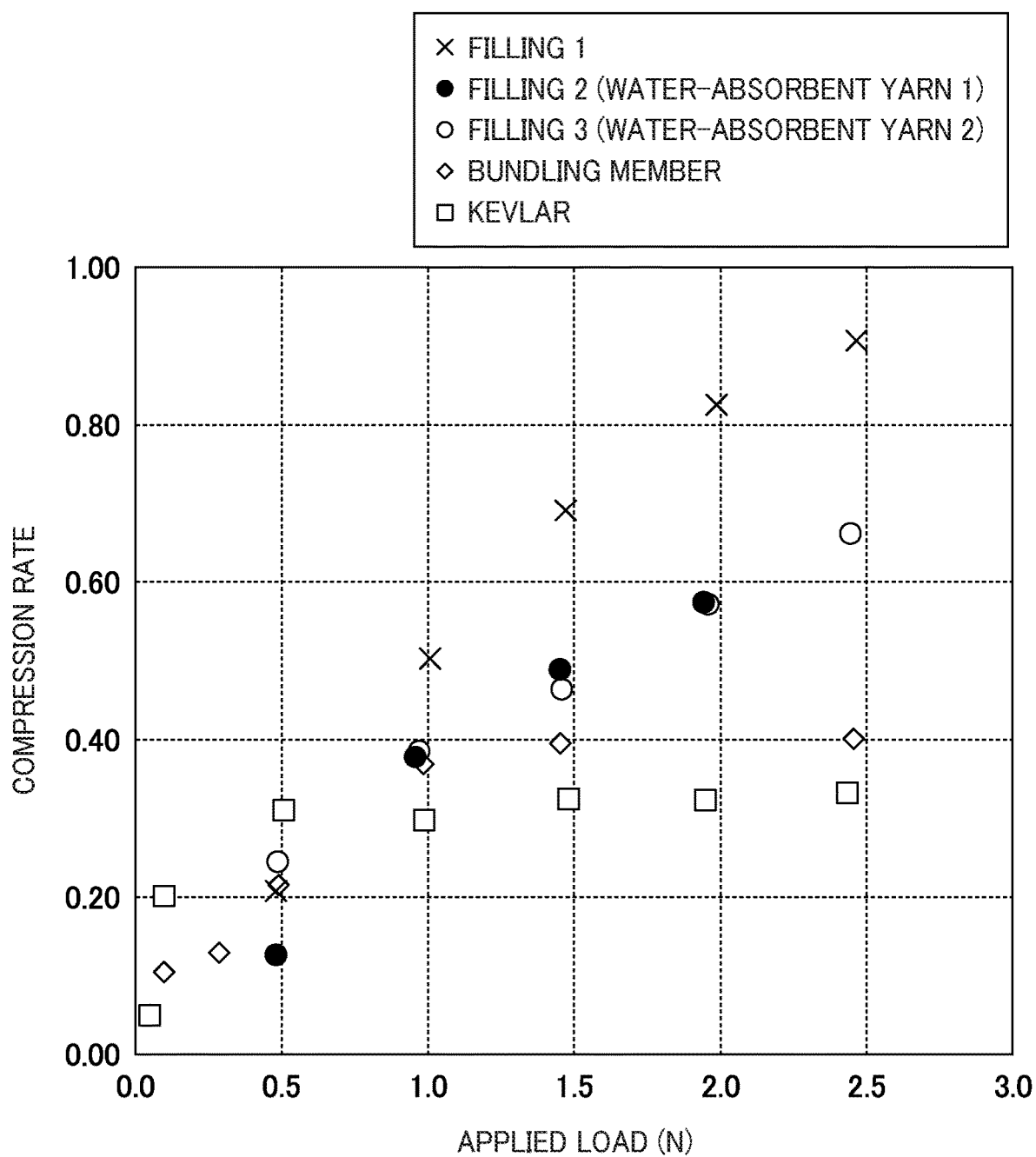
FIG. 11 is a graph showing the relation between an applied load P and the compression rate R.

FIG. 11 is a graph showing the relation between the applied load P and the compression rate R. The horizontal axis of the graph represents the tensile load P(N) applied to the winding member 53 in FIGS. 9A and 9B. The vertical axis of the graph represents the compression rate R of the member to be measured 19.

As shown in FIG. 11, with the bundling member and the Kevlar, when the applied load P was 1.0 N or greater, the compression rate R changed very little, and the amount of change of the compression rate R was within the margin of measurement error. By contrast, with the fillings (the fillings 1 to 3), when the applied load P was 1.0 N or greater, the compression rate R increased as the applied load P increased. In other words, the graph shows that the bundling member and the Kevlar are members such that their cross-sectional shapes change not easily upon reception of lateral pressure, whereas the fillings are members such that their cross-sectional shapes change greatly upon reception of lateral pressure compared to the bundling member and the Kevlar. A member whose cross-sectional shape changes greatly when receiving lateral pressure can continue filling a gap inside the optical cable 1 and therefore can maintain the postures of members in the space inside the optical cable 1 (e.g., the optical fiber units 11). Thus, the filling may be such that its compression rate R increases as the applied load P increases as shown in FIG. 11. Particularly, the filling may be such that its compression rate R increases as the applied load P increases when the applied load P is 1.0 N or greater. Note that it is believed that the compression rate R increasing as the applied load P increases when the applied load P is in a range exceeding 1.0 N is also effective in reducing microbending losses of the optical fibers.

As shown in FIGS. 10 and 11, with the bundling member and the Kevlar, the compression rate R did not change when the applied load P was in a range from 1.5 N to 2.0 N. This means that once the applied load P reached 1.5 N to 2.0 N, the cross-sectional shapes of the bundling member and the Kevlar did not change even if lateral pressure changed, and therefore means that the cross-sectional shapes of the bundling member and the Kevlar did not change once the applied load P exceeded 1.5 N. By contrast, with the filling (the fillings 1 to 3), when the applied load P was in a range from 1.5 N to 2.0 N, the compression rate R increased as the applied load P increased. This means that, unlike the bundling member and the Kevlar, the cross-sectional shape of the filling (the fillings 1 to 3) was able to change even after the applied load P exceeded 1.5 N. In this way, when the filling (the fillings 1 to 3) is compared with the bundling member and the Kevlar, when the applied load P was in a range from 1.5 N to 2.0 N, there was a great difference in change in the compression rate R, and based on such a difference in change in the compression rate R, it is believed that untwisting of optical fiber units was reduced in the optical cable formed by wrapping the filling (the fillings 1 to 3) around the outer circumferences of the optical fiber units. Thus, the fillings may have a property such that the compression rate R increases as the applied load P increases at least when the applied load P is in a range from 1.5 N to 2.0 N.

The right side of FIG. 10 shows the rate of change α of the compression rate when the applied load P is in a range from 1.5 N to 2.0 N (the ratio of the amount of increase in the compression rate R to the amount of increase in the applied load P). A member having a large rate of change α of the compression rate has a property such that its compression rate R increases easily as the applied load P increases. The rate of change α of the compression rate of each member shown in FIG. 10 corresponds to the slope of the graph in FIG. 11 when the applied load P is in a range from 1.5 N to 2.0 N and corresponds to the slope of a line connecting two measurement results in FIG. 11 when the applied load P is in a range from 1.5 N to 2.0 N. The rates of change α of the compression rate of the fillings are 0.17 to 0.26 (unit: $N^{-1}$) (by contrast, the rate of change α of the compression rate of the bundling member or Kevlar is almost zero). In this way, the filling 17 wrapped around the outer circumference of the fiber group 14 described above may be a member such that the rate of change α of the compression rate (the ratio of the amount of increase in the compression rate R to the amount of increase in the applied load P) when the applied load P is in a range from 1.5 N to 2.0 N is 0.17 or greater.

As shown in FIGS. 10 and 11, the maximum value of the compression rate R of the bundling member was 0.40, and the maximum value of the compression rate R of the Kevlar was 0.33. By contrast, the maximum values of the compression rate R of the fillings 1 to 3 were 0.91, 0.57, and 0.66, respectively, and the compression rate R was large compared to those of the bundling member and the Kevlar. This is because with the bundling member and the Kevlar, the compression rate R changed very little when the applied load P was 1.0 N or greater, whereas with the filling (the fillings 1 to 3), the compression rate R changed even when the applied load P was 1.0 N or greater and its cross section greatly changed. As thus demonstrated from this point, while the bundling member and the Kevlar are members such that their cross-sectional shapes change not easily upon reception of lateral pressure, the filling is, compared to the bundling member and the Kevlar, a member whose cross-sectional shape greatly changes when receiving lateral pressure. As described above, a member whose cross-sectional shape greatly changes when receiving lateral pressure can continue filling a gap inside the optical cable 1 and therefore can maintain the postures of the members in the space inside the optical cable 1 (e.g., the optical fiber units 11). For this reason, the filling may be configured to deform such that the compression rate R is 0.57 or greater.

It was confirmed that when the load applied to the winding member 53 was canceled (when the lateral pressure applied to the member to be measured 19 was removed) after the measurement of the compression rate, the cross-sectional shape of the filling (the fillings 1 to 3) greatly changed and was restored almost to the pre-measurement cross-sectional shape. In this way, the filling 17 wrapped around the outer circumference of the fiber group 14 described above may have a property such that its cross-sectional shape is easily restored after removal of lateral pressure (a high restoration rate).

Figure 12:
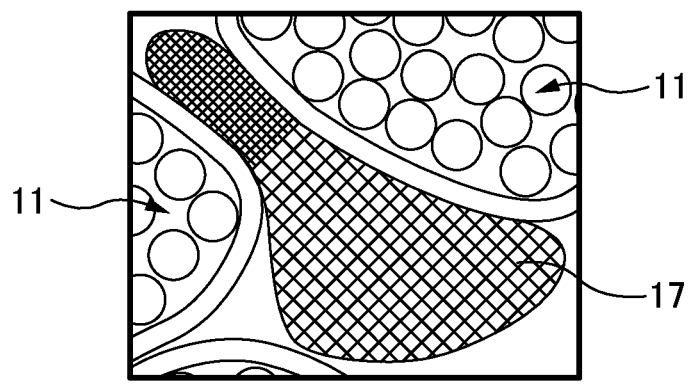
FIG. 12 is a diagram illustrating the cross section of a filling 17 in the optical cable 1.

FIG. 12 is a diagram illustrating a cross section of the filling 17 in the optical cable 1. FIG. 12 is a diagram enlarging and illustrating an area around a certain filling 17 in the optical cable 1 shown in FIG. 1B. The cross section of the filling 17 in FIG. 12 is hatched according to density. Here, a high-density part of the filling 17 is hatched densely, and a low-density part thereof is hatched less densely.

As shown in FIG. 12, a cross section of the filling 17 has regions having different densities from each other. The filling 17 has a relatively low density in a part filling a relatively large gap inside the optical cable 1 (the less densely hatched region) and has a relatively high density in a part filling a relatively small gap inside the optical cable 1 (the densely hatched region). Thus, the high-density area is receiving a larger lateral pressure from the surroundings than the low-density area, and as a result, is believed to be greatly compressively deformed. A given cross section of the filling 17 may have regions having different densities from each other in this way. In other words, in a given cross section of the filling 17, the density of the filling 17 may be uneven. To put it differently, the filling 17 may be configured to deform so that there may be regions having different densities from each other in a given cross section (the filling 17 may be configured to deform so that the density may be different depending on a region). By using such a filling 17, the filling 17 can continue filing a gap inside the optical cable 1 by following the deformation of the internal space, and can maintain the postures of the members in the space inside the optical cable 1 (e.g., the optical fiber units 11).

Other Embodiments

Although the disclosure has been described with respect to only a limited number of embodiments, those skilled in the art, having benefit of this disclosure, will appreciate that various other embodiments may be devised without departing from the scope of the present disclosure. Accordingly, the scope of the disclosure should be limited only by the attached claims.

What is claimed is:

1. An optical cable comprising:
    twisted optical fiber units each comprising a fiber group formed by optical fibers, wherein
    at least one of the optical fiber units comprises a filling that wraps an outer circumference of the fiber group, and
    P1/P2 is 0.1 or greater, where
        P1 is a pitch of wrapping of the filling, and
        P2 is a pitch of twisting of the optical fiber units.
2. The optical cable according to claim 1, wherein the optical fiber units are twisted in an S-Z configuration.
3. The optical cable according to claim 1, wherein the optical fiber units each comprise a bundling member bundling the optical fibers together.
4. The optical cable according to claim 3, wherein the filling wraps an outer side of the bundling member.
5. The optical cable according to claim 1, wherein at least one of the optical fiber units does not comprise the filling.
6. The optical cable according to claim 1, wherein
    one of the optical fiber units forms an inner-layer unit,
    the optical fiber units circumferentially placed outside the inner-layer unit form an outer-layer unit, and
    the at least one of the optical fiber units forming the inner-layer unit comprises the filling.
7. The optical cable according to claim 6, wherein the optical fiber units that form the outer-layer unit comprise:
    one of the optical fiber units comprising the filling; and
    one of the optical fiber units that does not comprise the filling.
8. The optical cable according to claim 7, wherein, in the outer-layer unit, the one of the optical fiber units that does not comprise the filling is disposed between two of the optical fiber units comprising the filling.
9. The optical cable according to claim 1, wherein the filling wraps only the outer circumference of the fiber group in an S-Z configuration.
10. An optical cable comprising:
    twisted optical fiber units each comprising a fiber group formed by optical fibers, wherein
    at least one of the optical fiber units comprises a filling that wraps an outer circumference of the fiber group, and
    a compression rate R increases as a load P that is 1 N or greater increases, where
        P is a load applied to a winding member wound around an outer circumference of the filling in a unit of N, and
        R is a compression rate of the filling to which the load P applied to the winding member gives lateral pressure.
11. The optical cable according to claim 10, wherein the load P is in a range from 1.5 N to 2.0 N.
12. The optical cable according to claim 10, wherein the load P is in a range from 1.5 N to 2.0 N, and
    α is 0.17 or greater, where
        α is a ratio of an amount of increase in the compression rate R to an amount of increase in the load P in a unit of $N^{-1}$.
13. An optical cable comprising:
    twisted optical fiber units each comprising a fiber group formed by optical fibers, wherein
    at least one of the optical fiber units comprises a filling that wraps an outer circumference of the fiber group, and
    the filling is configured to deform such that a compression rate R is 0.57 or greater, where
        P is a load applied to a winding member wound around an outer circumference of the filling in a unit of N, and
        R is a compression rate of the filling to which the load P applied to the winding member gives lateral pressure.

* * * * *